(12) United States Patent
Fisher

(10) Patent No.: US 11,732,464 B2
(45) Date of Patent: Aug. 22, 2023

(54) SECURING ASSEMBLY

(71) Applicant: GRIPPLE LIMITED, Sheffield (GB)

(72) Inventor: Thomas Edward Francis Fisher, Sheffield (GB)

(73) Assignee: GRIPPLE LIMITED

( * ) Notice: Subject to any disclaimer, the term of this patent is extended or adjusted under 35 U.S.C. 154(b) by 535 days.

(21) Appl. No.: 16/479,866

(22) PCT Filed: Jan. 30, 2018

(86) PCT No.: PCT/GB2018/000018
§ 371 (c)(1),
(2) Date: Jul. 22, 2019

(87) PCT Pub. No.: WO2018/142098
PCT Pub. Date: Aug. 9, 2018

(65) Prior Publication Data
US 2021/0348380 A1 Nov. 11, 2021

(30) Foreign Application Priority Data

Feb. 2, 2017 (GB) ..................................... 1701736
Jan. 23, 2018 (GB) ..................................... 1801095

(51) Int. Cl.
*F16B 5/02* (2006.01)
*E04B 1/41* (2006.01)
(Continued)

(52) U.S. Cl.
CPC ................. *E04B 1/40* (2013.01); *E04B 9/18* (2013.01); *E04B 9/34* (2013.01); *F16B 5/0275* (2013.01);
(Continued)

(58) Field of Classification Search
CPC .... F16B 5/0275; F16B 13/002; F16B 5/0092; F16B 5/10; F16B 5/0685; F16B 5/0233;
(Continued)

(56) References Cited

U.S. PATENT DOCUMENTS 268,473 A * 12/1882 Fagan .................. B65D 47/242
222/569
314,075 A * 3/1885 Staunton ................. E04D 3/366
52/466
(Continued)

FOREIGN PATENT DOCUMENTS

EP 2712977 A1 4/2014
EP 2 884 019 A1 * 6/2015
(Continued)

*Primary Examiner* — Flemming Saether
(74) *Attorney, Agent, or Firm* — Clark Hill PLC; James R. Foley

(57) ABSTRACT

A securing assembly (10) for use in suspending an article, the securing assembly comprising an insertion arrangement (14) for insertion into the article, and an attaching arrangement (12) for attaching the insertion arrangement to a connector (104). The connector is configured to connect the securing assembly (10) to an elongate suspending member (100). Each of the insertion arrangement (14) and the attaching arrangement (12) define a respective through passage (46, 48) to allow the suspending member (100) to be inserted through the securing assembly (10).

20 Claims, 7 Drawing Sheets

(51) Int. Cl.
  *E04B 9/18* (2006.01)
  *E04B 9/34* (2006.01)
  *F16B 13/00* (2006.01)

(52) U.S. Cl.
  CPC ...... *F16B 13/002* (2013.01); *F16B 2013/009* (2013.01)

(58) Field of Classification Search
  CPC .......... F16B 21/02; F16B 36/06; F16B 21/04; F16B 35/041; E04B 1/40; E04B 9/18; F16M 13/027; F21V 20/047; F21V 21/043; F21V 21/041; F21V 21/047
  USPC ........ 411/400, 401, 395, 546, 388, 349, 549
  See application file for complete search history.

(56) References Cited

U.S. PATENT DOCUMENTS

| | | | | |
|---|---|---|---|---|
| 1,813,790 A * | 7/1931 | Wildish | ............. | F27D 1/147 |
| | | | | 411/395 |
| 2,762,598 A * | 9/1956 | Runge | ............. | F21V 21/112 |
| | | | | 248/327 |
| 2,787,051 A * | 4/1957 | Risley | ............. | F16B 35/04 |
| | | | | 138/97 |
| 3,022,034 A * | 2/1962 | Purdy | ............. | E04B 1/40 |
| | | | | 248/342 |
| 3,778,957 A * | 12/1973 | Appleberry | ............. | F16B 5/0233 |
| | | | | 52/22 |
| 4,720,204 A * | 1/1988 | Johnson | ............. | G09F 17/00 |
| | | | | 403/2 |
| 5,059,077 A * | 10/1991 | Schmid | ............. | A47G 1/20 |
| | | | | 411/397 |
| 5,080,269 A * | 1/1992 | Larsson | ............. | F16B 37/042 |
| | | | | 224/42.12 |
| 5,358,209 A * | 10/1994 | Ward | ............. | E04H 12/2223 |
| | | | | 248/530 |
| 5,928,468 A * | 7/1999 | Tolson | ............. | A61B 17/8816 |
| | | | | 156/578 |
| 6,811,364 B2 * | 11/2004 | Kelzer | ............. | B23B 31/1122 |
| | | | | 411/389 |
| 7,713,013 B2 * | 5/2010 | Sedgwick | ............. | F16B 23/0092 |
| | | | | 411/411 |
| 8,413,398 B1 | 4/2013 | Allred et al. | | |
| 9,428,258 B2 * | 8/2016 | Benthien | ............. | B32B 3/06 |
| 9,556,614 B2 * | 1/2017 | Van Dore | ............. | E04B 9/0478 |
| 10,344,789 B2 * | 7/2019 | Daykin | ............. | F16B 31/027 |
| 2006/0280579 A1 * | 12/2006 | Seidl | ............. | F16B 5/0233 |
| | | | | 411/546 |
| 2015/0240490 A1 * | 8/2015 | Firinga | ............. | E04B 9/12 |
| | | | | 52/506.05 |
| 2016/0316846 A1 * | 11/2016 | Salvetti | ............. | A42B 3/04 |
| 2019/0211863 A1 * | 7/2019 | Hepworth | ............. | F16B 21/02 |
| 2020/0191190 A1 * | 6/2020 | Steffenfauseweh | ............. | F16B 25/0031 |
| 2020/0378427 A1 * | 12/2020 | Tjerrild | ............. | F16B 5/0685 |
| 2021/0164225 A1 * | 6/2021 | Nilsson | ............. | E04B 9/001 |

FOREIGN PATENT DOCUMENTS

| | | |
|---|---|---|
| EP | 2 546 430 A1 * | 1/2016 |
| EP | 3101188 A1 | 12/2016 |
| GB | 2378999 A | 2/2003 |
| GB | 2509807 A | 7/2014 |
| JP | 2011132777 A | 7/2011 |

* cited by examiner

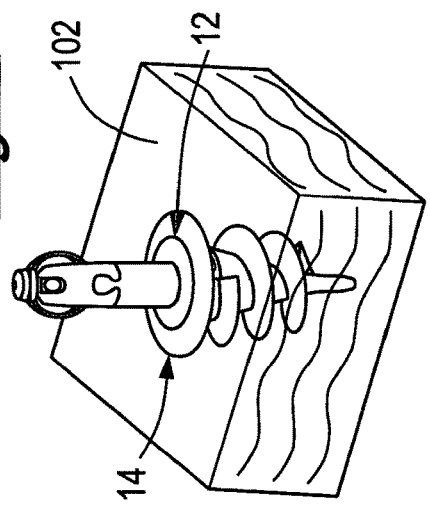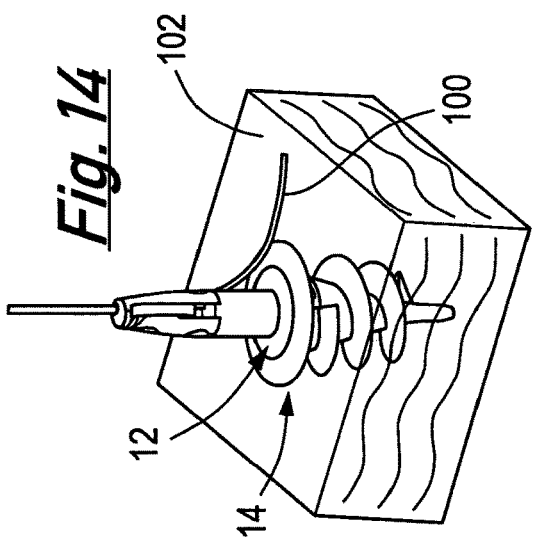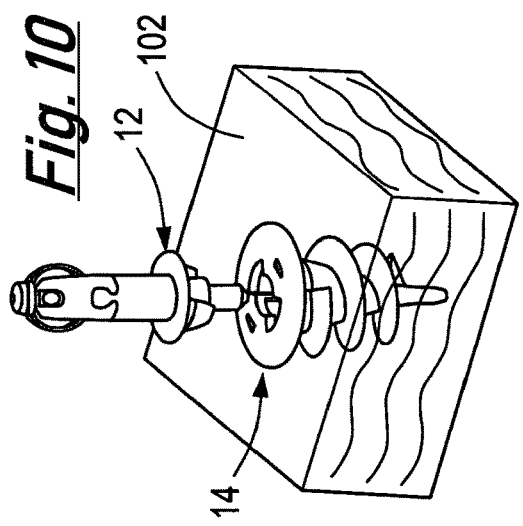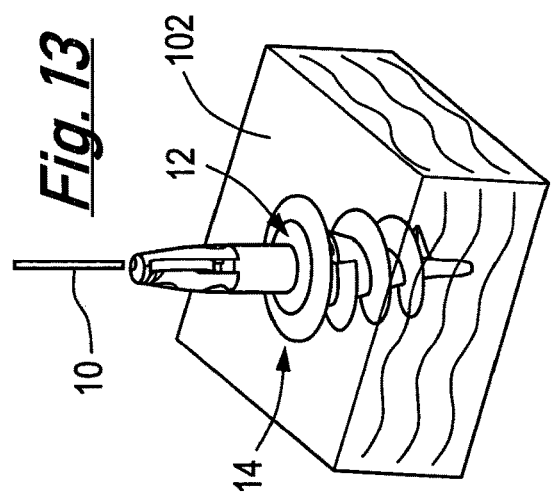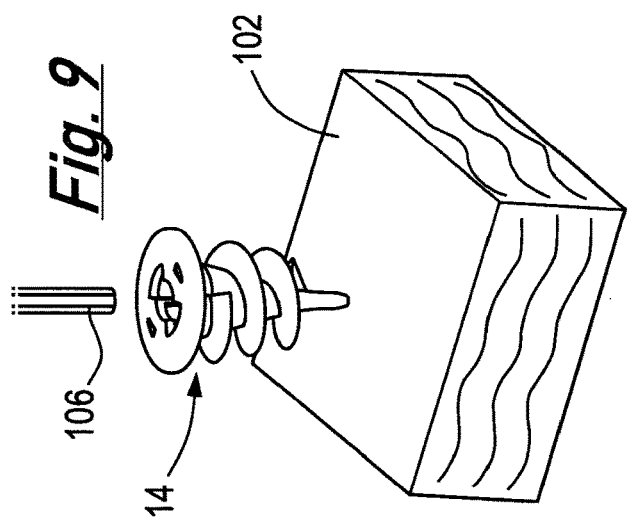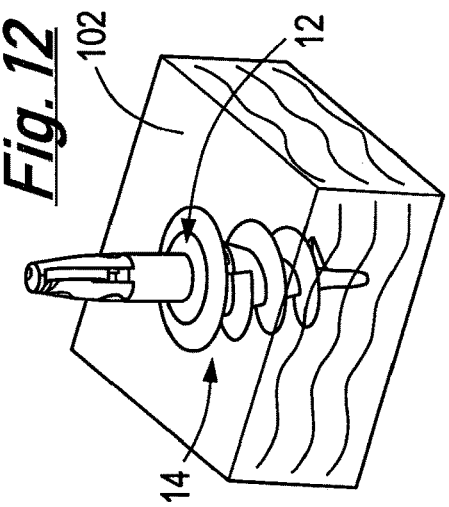

SECURING ASSEMBLY

BACKGROUND OF THE INVENTION

This invention relates to securing assemblies. More particularly, but not exclusively, this invention relates to securing devices for use in suspending panels, for example, acoustic panels. This invention also relates to insertion arrangements for use in securing assemblies.

Acoustic panels can be suspended from ceilings by the use of cables attached to suitable fixings, such as, pins. However, such fixings can be disadvantageous where it is desired to suspend the panels in more than one layer.

SUMMARY OF THE INVENTION

According to one aspect of this invention, there is provided a securing assembly for use in suspending an article, the securing assembly comprising an insertion arrangement for insertion into the article, and an attaching arrangement for attaching the insertion arrangement to a connector, the connector being configured to connect the securing assembly to an elongate suspending member, wherein each of the insertion arrangement and the attaching arrangement define a respective through passage to allow the suspending member to be inserted through the securing assembly.

According to another aspect of this invention, there is provided a method of using a securing assembly as described in the immediately preceding paragraph, said method comprising inserting the insertion arrangement into an article, and connecting the connector to the elongate suspending member.

The method may further include disposing the elongate suspending member through the passages in the insertion arrangement and the attaching arrangement, and through the article to a further securing assembly and a further article.

The elongate suspending member may comprise a cable, wire, wire rope or the like.

The method may include forming a bore in the article when the insertion arrangement is inserted therein. The step of forming the bore may comprise pushing a piercing tool through the passage in the insertion arrangement and through the article.

The article may be an insulation panel, such as an acoustic insulation panel.

The passage extending through the insertion arrangement may be substantially coaxially aligned with the passage extending through the attaching arrangement.

The insertion arrangement may comprise an insertion portion to be inserted into the article.

The insertion arrangement and the attaching arrangement may comprise cooperating joining formations to join the attaching arrangement to the insertion arrangement.

According to another aspect of this invention, there is provided an insertion arrangement comprising an insertion portion for insertion into an article, and a cooperating joining formation for joining the insertion arrangement to an attaching arrangement, wherein the insertion portion defines a through passage to allow a suspending member to be inserted therethrough.

The insertion portion may have a thread thereon. The insertion arrangement may further include a load spreading portion on the insertion portion. The load spreading portion may extend radially outwardly from the insertion portion.

The insertion portion may be conical. The thread on the insertion portion may be conical. The method may comprise screwing the insertion arrangement into the article.

The load spreading portion may extend radially outwardly from the insertion portion.

In one embodiment, the load spreading portion may comprise a first flange which may extend radially outwardly from the insertion portion.

The insertion portion may define a tool receiving cavity to receive a tool, the tool being configured to drive the insertion arrangement into the article. The tool receiving cavity may extend inwardly from an opening in the insertion portion.

The tool receiving cavity may include a polygonal socket to receive the tool. The tool may be a key which can be used to drive the insertion arrangement into the article. The method may comprise inserting the insertion arrangement into the article, putting a key in the socket and rotating the key to drive the insertion arrangement further into the article.

According to another aspect of this invention, there is provided an attaching arrangement for attaching an insertion arrangement to an elongate suspending member, the attaching arrangement comprising a cooperating joining formation for joining the attaching arrangement to an insertion arrangement, wherein the attaching arrangement defines a through passage to allow a suspending member to be inserted therethrough.

The attaching arrangement may comprise a guide member which can be received by the insertion arrangement. The passage in the attaching arrangement may extend through the guide member. The guide member may be received in the tool receiving cavity. The passage in the attaching arrangement may extend through the guide member.

The guide member may be configured to guide the elongate suspending member into the through passage defined by the insertion arrangement. The elongate suspending member is arranged through the guide member so that the elongate suspending member extends through the passage in the insertion arrangement. The method may comprise arranging the elongate suspending member through the guide member so that the elongate suspending member extends through the passage in the insertion arrangement.

A first joining formation may be provided on the insertion portion of the insertion arrangement. A second joining formation may be provided on the guide member of the attaching arrangement.

The first and second joining formations may comprise respective first and second projecting members. The first projecting member may engage the second projecting member to join the attaching arrangement to the insertion arrangement.

The attaching arrangement may be joined to the insertion arrangement by the second projecting member engaging behind the first projecting member.

One of the first and second projecting members may extend over a receiving formation defined by the insertion arrangement or the attaching arrangement. The other of the first and second projecting members may extend outwardly to be received in the receiving formation.

In the embodiment described herein, the first projecting member may extend over the tool receiving cavity of the insertion arrangement. The first projecting member may be in the form of an overhanging member which overhangs the tool receiving formation. The second projecting member may extend outwardly from the guide member of the attaching arrangement.

The second joining formation may be disposed in the tool receiving cavity. By twisting the attaching arrangement, joining of the insertion arrangement to the attaching arrangement may be effected. The method may comprise disposing the second joining formation in the tool receiving cavity, and twisting the attaching arrangement to effect joining of the insertion arrangement to the attaching arrangement.

The first joining formation may comprise a plurality of the first projecting members. The first joining formation may comprise two of the first projecting members. The second joining formation may comprise a plurality of the second projecting members. The second joining formation may comprise two of the second projecting members.

The attaching arrangement may include an engaging formation for engaging the load spreading portion when the second joining formation is received in the cavity. The engaging formation may comprise a second flange.

The engaging formation and the load spreading formation may include cooperating locking formations to lock the attaching arrangement and the insertion arrangement to each other when they are joined together. The locking formations may comprise a detent arrangement. The locking formations may comprise a sloping indentation and a sloping protrusion which can cooperate with each other to lock the load spreading formation and the engaging formation to each other. The locking formations may comprise a pair of sloping indentations and a pair of sloping protrusions.

A gap may be defined between the second joining formation and the engaging formation. The attaching arrangement may be joined to the insertion arrangement by the first joining formation being received in the gap between the second joining formation and the engaging formation.

The first joining formation may comprise a pair of opposed first projecting members, which may be disposed opposite one another across the tool receiving formation. The second joining formation may comprise a pair of the second projecting members, which may extend opposite each other from the guide member.

The attaching arrangement may further include a fastening formation for fastening the attaching arrangement to the connector. The fastening formation may be threaded so that the connector and the attaching arrangement can be fastened to each other by screwing one into the other. The method may comprise fastening the attaching arrangement and the connector to each other by screwing one into the other.

The attaching formation may include a threaded lug. The threaded lug may be screwed into a threaded bore in the connector to fasten the attaching formation to the connector. The method may comprise screwing the lug into the threaded bore to fasten the attaching formation to the connector.

BRIEF DESCRIPTION OF THE DRAWINGS

An embodiment of the invention will now be described by way of example only, with reference to the accompanying drawings, in which:

FIGS. 9 to 14 show the steps of one method of securing an elongate suspending member to an article.

DETAILED DESCRIPTION OF THE INVENTION

Figure 1:
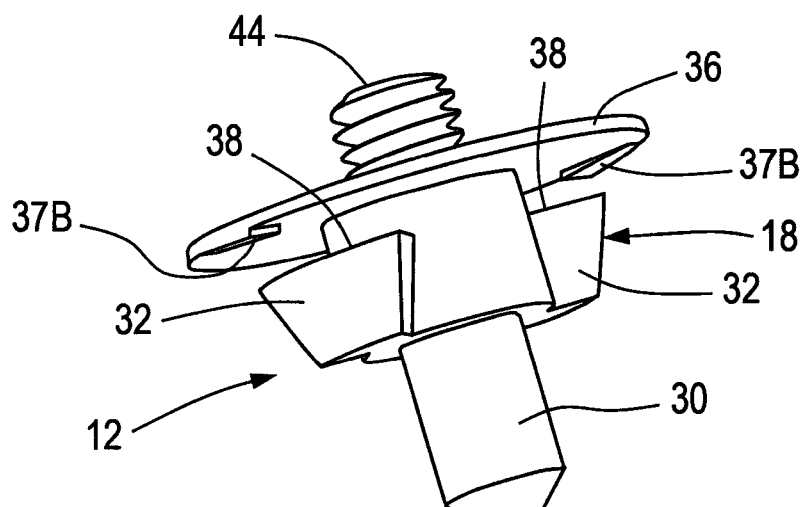
FIG. 1 is a perspective view of an attaching arrangement, forming part of a securing assembly.
Figure 2:
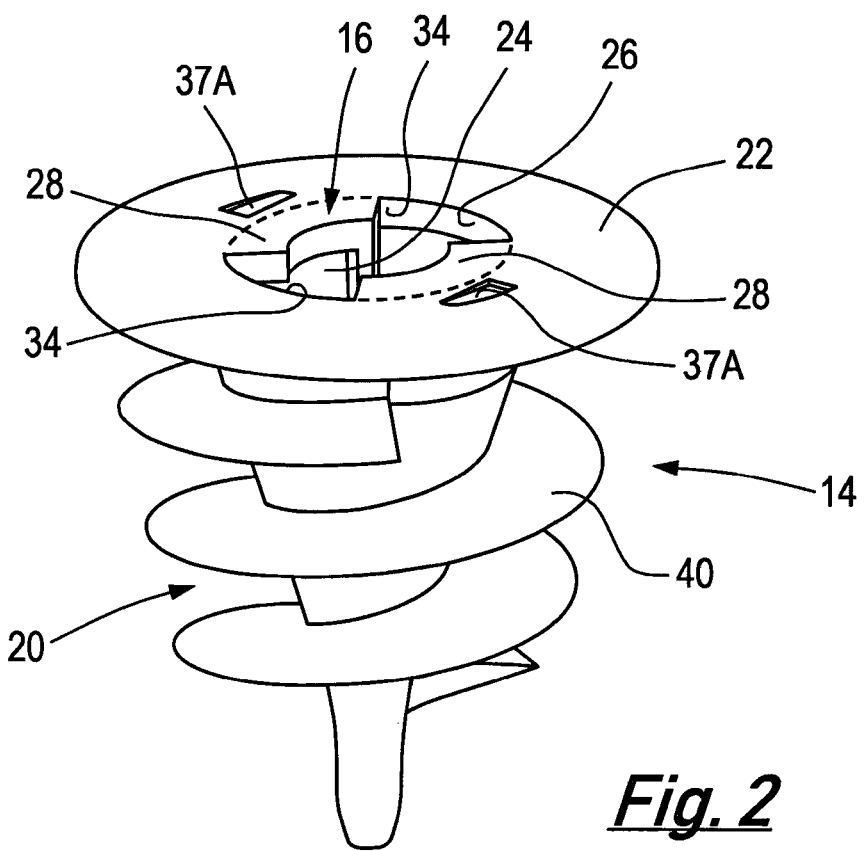
FIG. 2 is a perspective view of an insertion arrangement, forming another part of the securing assembly.
Figure 3:
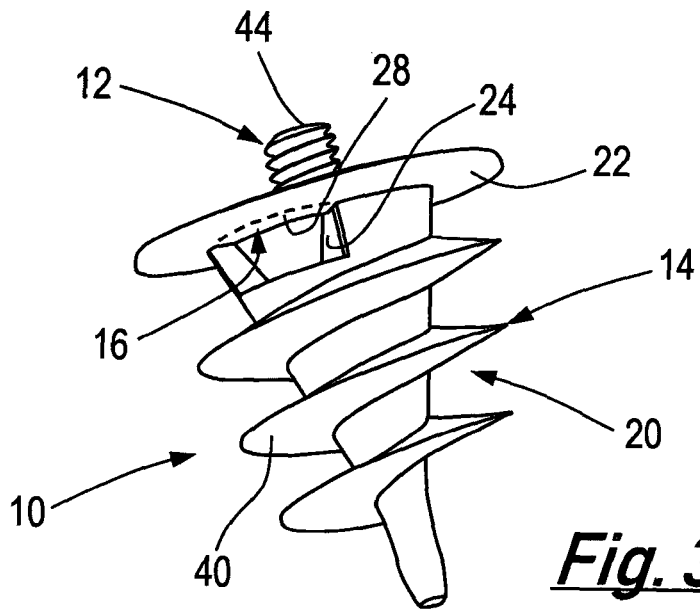
FIG. 3 is a perspective view of the securing assembly.

FIGS. 1 and 2 show two parts of a securing assembly 10 for securing an elongate suspending member, in the form of a cable 100 (see FIGS. 14 and 16), to an article, in the form of an acoustic insulation panel 102 (see FIGS. 9 to 16). The securing assembly 10 is shown assembled in FIGS. 2, 3 and 4.

The securing assembly 10 comprises an attaching arrangement 12 and an insertion arrangement 14. The attaching arrangement 12 attaches the securing assembly 10 to a connector 104. The insertion arrangement 12 can be inserted into the insulation panel 102 to affix the securing assembly 10 thereto.

The insertion arrangement 14 comprises a first joining formation 16. The attaching arrangement 12 comprises a second joining formation 18. The first and second joining formations 16, 18 cooperate with each other to join the attaching arrangement 12 to the insertion arrangement 14.

The insertion arrangement 14 comprises an insertion portion 20 and a radially outwardly extending load spreading first flange 22 extending from the insertion portion 20. The insertion portion 20 defines a cavity 24 having an opening 26. The joining formations 18 of the insertion arrangement 14 comprise a pair of inwardly extending opposed first projecting members, in the form of overhanging members 28 which overhang the cavity 24.

The overhanging members 28 extend over the cavity 24 to define the opening 26. The projecting members 28 are shown by the broken lines in FIGS. 2, 3, 6 and 7.

The attaching arrangement 12 comprises a guide member 30, the purpose of which is explained below. The second joining formations 18 comprise a pair of oppositely radially outwardly extending second projecting members 32 on the guide member 30. The second projecting members 32 overhang the cavity 24. A pair of opposed entry recesses 34 are defined between the overhanging members 28 to allow the second joining formations 18 of the attaching arrangement 12 to be received in the cavity 24.

The second projecting members 32 are of the same size and shape as the entry recesses 34, thereby allowing the second projecting members 32 to be received in the cavity 24.

The attaching arrangement 12 is joined to the insertion arrangement 14 by inserting the second projecting members 32 through the opening 26 so that the second projecting members 32 pass through the entry recesses 34 to be received in the cavity 24. When so received, the attaching arrangement 12 can be twisted by 90° so that the overhanging members 28 are received in the gaps 38, thereby joining the attaching arrangement 12 to the insertion arrangement 14.

The attaching arrangement 12 further includes an engaging formation in the form of a second flange 36 extending over the second projecting members 32. A gap 38 is defined between each second projecting member 32 and the second flange 36. The second flange 36 engages the first flange 22 when the second projecting members 32 are received in the cavity 24.

The first and second flanges 22, 36 comprise cooperating locking formations in the form of a detent arrangement 37 comprising a pair of sloping indentations 37A on the first flange 22 and a corresponding pair of sloping protrusions 37B. The protrusions 37B are received in the indentations 37A when the overhanging members 28 are received in the gaps 38 to lock the attaching arrangement 12 to the insertion arrangement 14.

The insertion portion 20 includes a thread 40, which is configured to allow the insertion portion 20 to be screwed into the insulation panel 102. The cavity 24 includes a socket 42, which may be a hexagonal socket. A driver 106 (see FIG. 9), which may be in the form of a key having a hexagonal profile (known as a "hex key"), is inserted into the socket 42 to screw the insertion portion 20 into the insulation panel 102.

The attaching arrangement 12 further includes fastening formation in the form of a threaded lug 44. The threaded lug 44 is screwed into the connector 104 to fasten the attaching arrangement 12 thereto.

Figure 15:
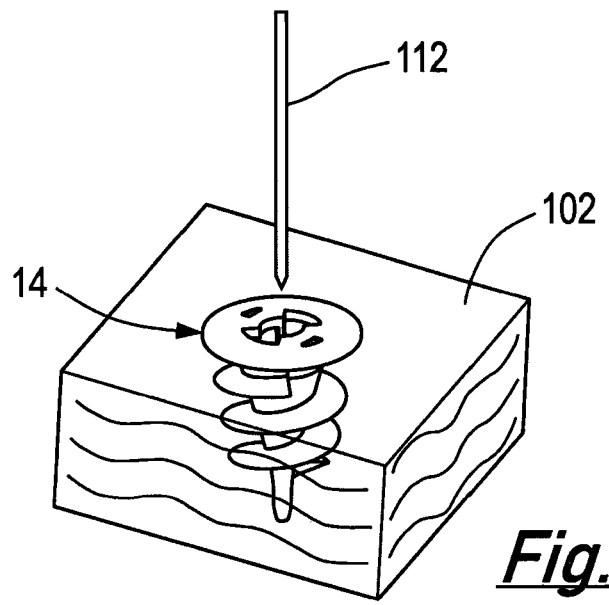
FIGS. 15 and 16 show two steps of a further method of securing an elongate suspending member to an article.

The connector 104 comprises a clamping part 108 and a connecting part 110. The clamping part 108 can be any suitable clamping part, such as a clamping assembly disclosed in published patent application No. GB 21129807. The connecting part 110 may be the same as the ancillary member disclosed in GB 21129807, having a sloping from which the cable 100 exits to one side via a side opening, as shown in FIG. 15. Alternatively, the connecting part 110 may define a through passage extending from one end to the other to allow the cable 100 to extend straight through the connecting part 110, as shown in FIG. 10.

Figure 4:
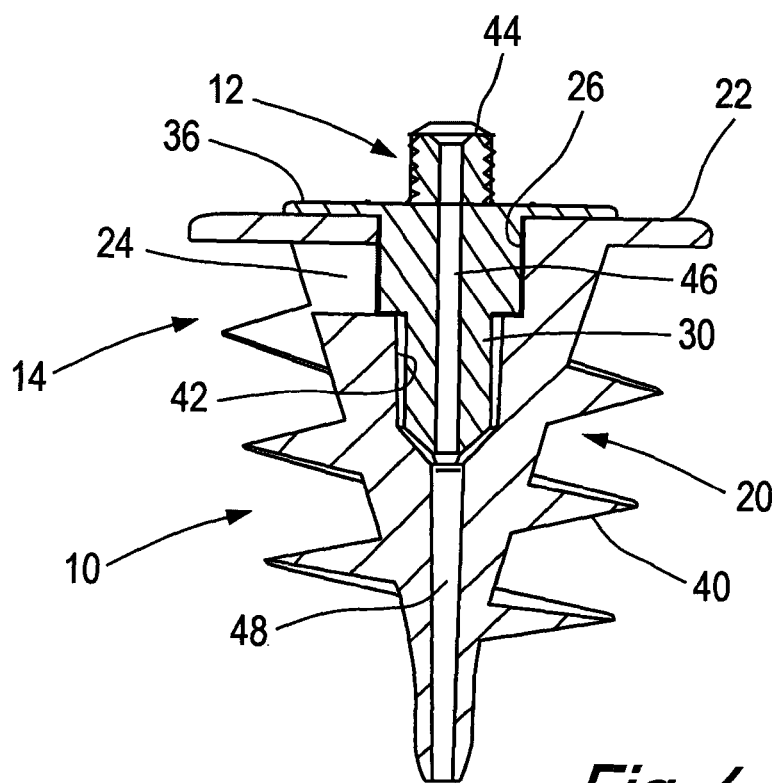
FIG. 4 is a sectional side view of the securing assembly.
Figure 5:
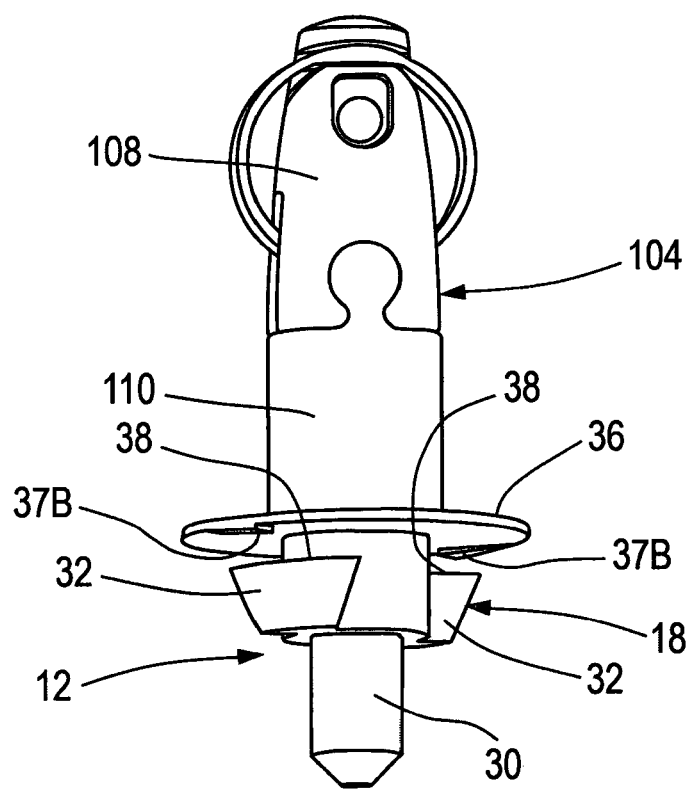
FIG. 5 is a side view showing the attaching arrangement fastened to a connector.
Figure 7:
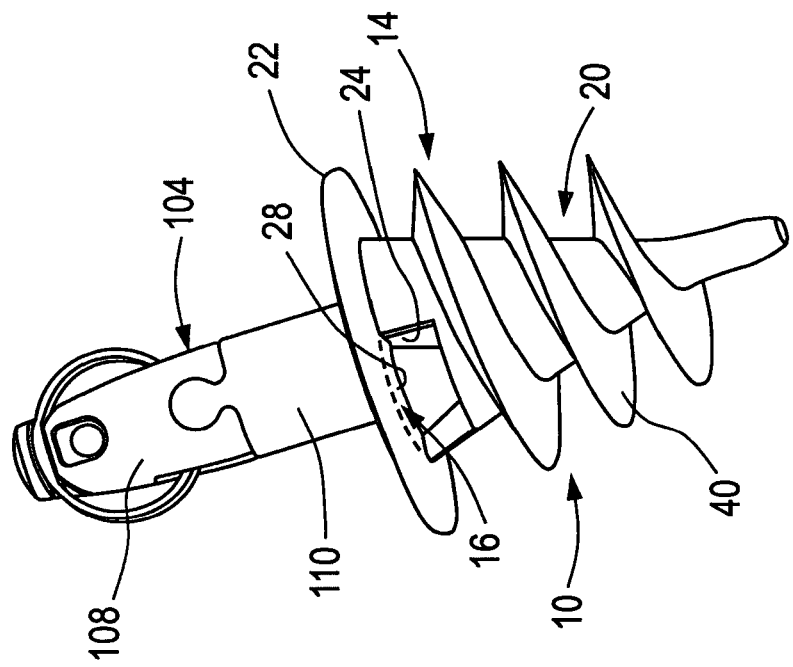
FIG. 7 is a perspective view showing the securing assembly fastened to a connector.
Figure 6:
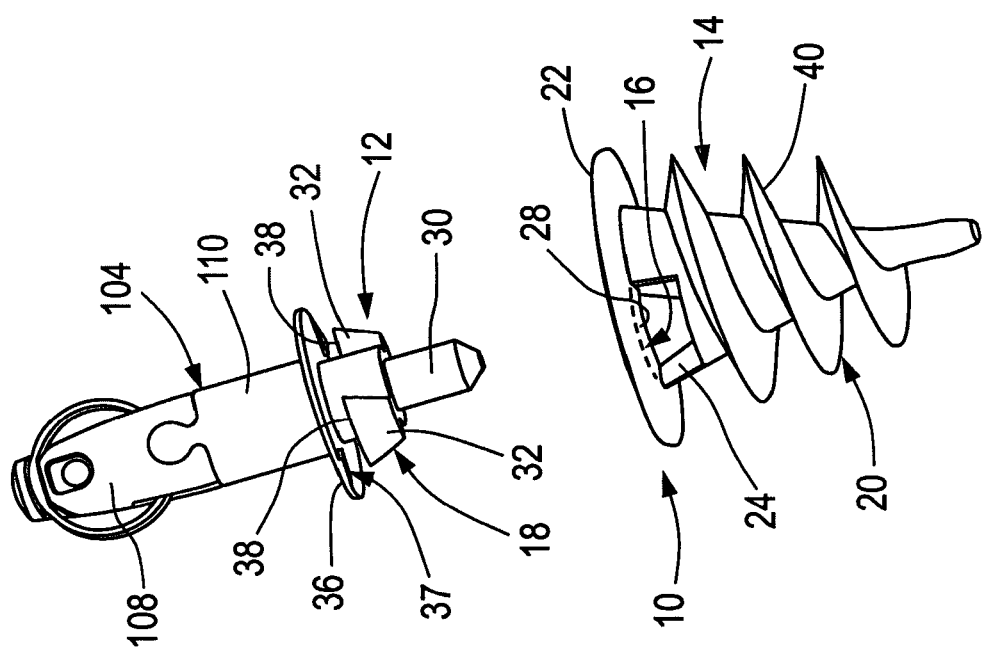
FIG. 6 is a perspective view of the attaching arrangement and the connector before the attaching arrangement is joined to the insertion arrangement.

As shown in FIG. 4, the attaching arrangement 12 and the insertion arrangement 14 define respective through passages 46, 48. The through passage 46 in the attaching arrangement 12 extends through the lug 44 and the guide member 30. The through passage 48 in the insertion arrangement 14 extends from the cavity 24 through the insertion portion 20.

As can be seen from FIG. 4, the guide member 20 extends into the socket 42, when the attaching arrangement 12 is joined to the insertion arrangement 14. The cable 100 is thereby guided by the guide member 20 from the passage 46 into the passage 48 when the cable 100 is pushed thought the securing assembly 10 from the connector 104.

Referring to FIGS. 9 to 14, a method of using the securing device 10 is shown. FIG. 9 shows the insertion of the insertion assembly 14 into the insulation panel 102. The driver 106 is inserted into the hexagonal socket 42 to screw the threaded insertion portion 20 into the insulation panel 102.

FIG. 10 shows the attaching arrangement 12 being joined to the insertion arrangement 14. The attaching arrangement 12 is fastened to a connector 104, which includes the clamping part 108 and the connecting part 110. In FIGS. 10 to 14, the connecting part 110 has a sloped wall so that the cable 100 extends out of the connecting part 108 at the side thereof, as shown in FIG. 14.

The attaching arrangement 12 is arranged on the insertion arrangement 14, as shown in FIG. 11, with the overhanging members 28 of the attaching arrangement 12 received within the cavity 24. The attaching arrangement 12 and the connector 104 are then twisted in the same direction as the insertion portion 20 was screwed into the insulation panel 102.

In the position shown in FIG. 12, the overhanging members 28 are received in the gap 38 between the second projecting members 32 and the second flange 36, thereby joining the attaching arrangement 12 and the insertion arrangement 14 to each other.

The cable 100 is then inserted through the clamping part 108 of the connector to pass out of the side of the connecting part 110, as shown in FIG. 14. A plurality of the securing assemblies can be attached to the insulation panel 102 to secure the insulation panel 102 to respective cables 100. The upper ends can be attached to a roof, ceiling or other upper support to suspend the insulation panels therefrom.

Figure 16:
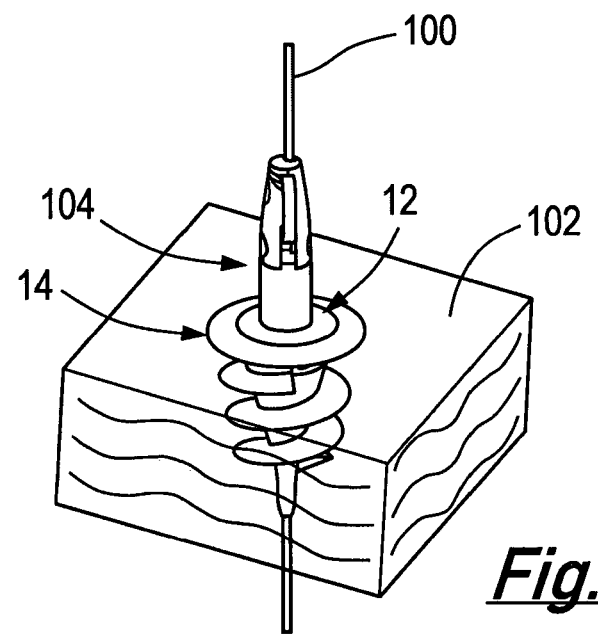

FIGS. 15 and 16 show a further method of using the securing assembly 10. The method shown in FIGS. 15 and 16 differs from the method shown in FIGS. 9 to 14 in that the connecting part 110 has a passage straight through that extends coaxially along its whole length with the passages 46, 48 in the insertion arrangement 12 and the attaching arrangement 14.

The first step of insertion of the insertion member 14 into the insulation panel 102 is the same as shown in FIG. 9 and is therefore not shown again.

FIG. 15 shows the step of piercing the insulation panel 102. A piercing tool 112 is inserted through the connector 104 and through the passages 46, 48 to pierce through the insulation panel 102 to create a channel therethrough to allow the cable 100 to be pushed through the insulation panel 102.

Figure 8:
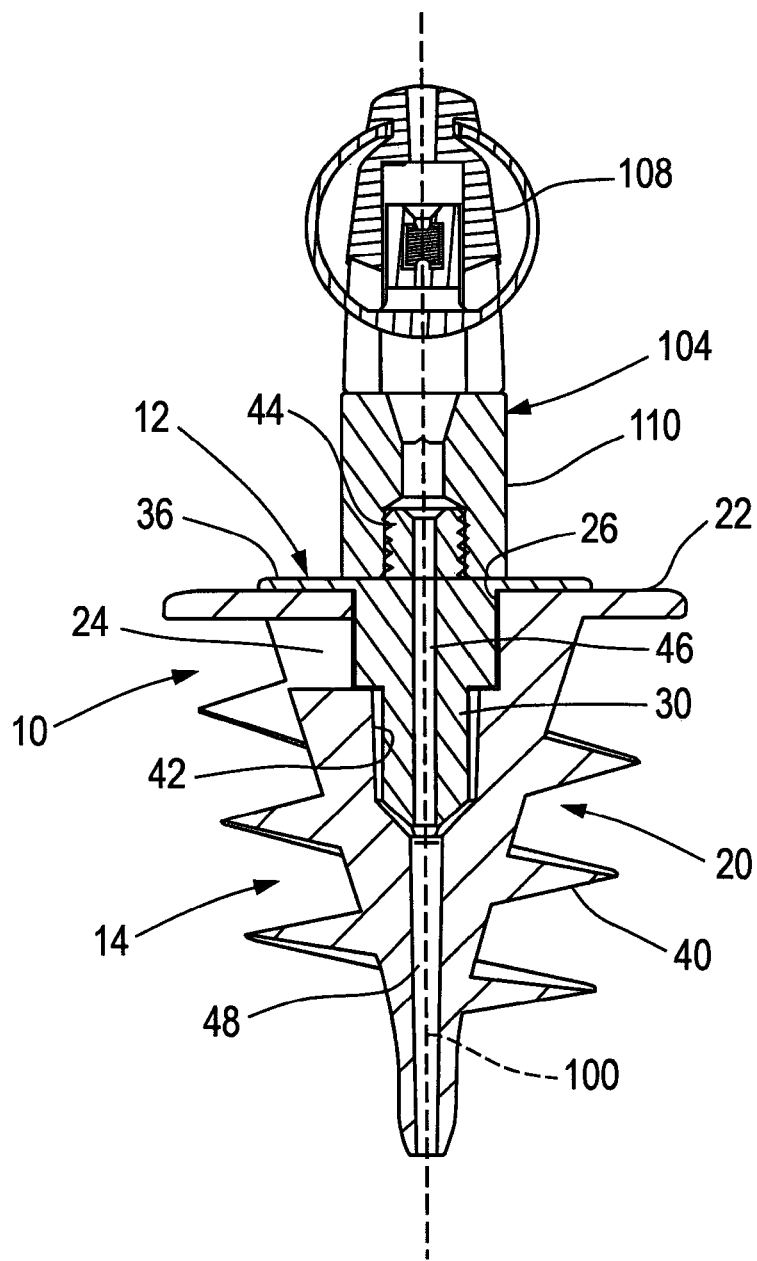
FIG. 8 is a sectional side view of the connector fastened to the securing assembly.

The subsequent steps in this method are the same as shown in FIGS. 10 to 13 and are therefore not shown again. FIG. 16 shows the final step, in which the cable 100 extends through the passages 46, 48 and through the channel pierced through the insulation panel 102. FIG. 8 shows the cable 100 extending through the passages 46, 48 and through the connector 104. In FIG. 8, the cable 100 is shown by a broken line.

The cable 102 can be threaded through the insulation panel 102 to a further article (not shown) beneath the insulation panel 102 shown. Additional securing assemblies are mounted on the further article to allow it to be secured to the cable 102. The further article can be a further insulation panel or another suitable article, for example, a lighting assembly or a cable tray.

There is thus described a securing assembly 10 that can be used to secure an insulation panel 102 to a cable 100 and, thereby, suspend the insulation panel 102 on the cable 100. The securing assembly 10 defines passages 46, 48 therethrough to allow the cable 100 to extend through the securing assembly 10 and through the insulation panel 102 to a further insulation panel and securing assembly below to suspend the further insulation panel beneath the insulation panel 102.

Various modifications can be made without departing from the scope of the invention. For example, other articles exist which can be used with the securing assembly 10, and which can be suspended by means of the securing assembly 10. Such articles can either be formed of a material into which the insertion portion 20 can be screwed, or have suitable threaded holes pre-formed therein.

The invention claimed is:

1. A securing assembly for use in suspending an article, the securing assembly comprising:
   an insertion arrangement for insertion into the article, the insertion arrangement comprising an insertion portion to be inserted into the article, wherein the insertion portion has an external thread thereon;
   an attaching arrangement for attaching the insertion arrangement to a connector configured to connect the securing assembly to an elongate suspending member;

wherein the attaching arrangement further includes a fastening formation for fastening the attachment arrangement to the connector;

wherein the insertion arrangement and the attaching arrangement comprise cooperating joining formations to join the attaching arrangement to the insertion arrangement;

wherein each of the insertion portion and the attaching arrangement define a respective through passage to allow the suspending member to be inserted through the securing assembly; and wherein the insertion portion defines a tool receiving cavity to receive a tool, the tool being configured to drive the insertion arrangement into the article, the tool receiving cavity extending inwardly from an opening in the insertion portion; and the attaching arrangement comprises a guide member which can be received in the tool receiving cavity, and wherein the passage in the attaching arrangement extends through the guide member.

2. A securing assembly according to claim 1, wherein the insertion arrangement further includes a load spreading portion on the insertion portion, the load spreading portion extending radially outwardly from the insertion portion.

3. A securing assembly according to claim 2, wherein the insertion portion is conical, and the thread on the insertion portion is conical, whereby the insertion arrangement can be screwed into the article.

4. A securing assembly according to claim 2, wherein the joining formations comprise a first joining formation on the insertion portion of the insertion arrangement, and the joining formations further include a second joining formation on the guide member of the attaching arrangement.

5. A securing assembly according to claim 4, wherein the first and second joining formations comprise respective first and second projecting members, the first projecting member engaging the second projecting member to join the attaching arrangement to the insertion arrangement.

6. A securing assembly according to claim 5, wherein one of the first and second projecting members extends over a receiving formation defined by the insertion arrangement or the attaching arrangement, and the other of the first and second projecting members extends outwardly to be received in the receiving formation.

7. A securing assembly according to claim 5, wherein the first projecting member extends over the tool receiving cavity of the insertion arrangement, and the second projecting member extends outwardly from the guide member of the attaching arrangement.

8. A securing assembly according to claim 5, wherein the first projecting member is in the form of an overhanging member which overhangs the tool receiving cavity, and the second joining formation may be disposed in the tool receiving cavity, whereby twisting the attaching arrangement effects joining of the insertion arrangement to the attaching arrangement.

9. A securing assembly according to claim 5, wherein the attaching arrangement includes an engaging formation for engaging the load spreading portion when the second joining formation is received in the cavity.

10. A securing assembly according to claim 9, wherein the engaging formation and the load spreading formation include cooperating locking formations to lock the attaching arrangement and the insertion arrangement to each other when they are joined together.

11. A securing assembly according to claim 10, wherein the locking formations comprise a sloping indentation and a sloping protrusion which can cooperate with each other to lock the load spreading formation and the engaging formation to each other.

12. A securing assembly according to claim 11, wherein the locking formations comprise a pair of sloping indentations and a pair of sloping protrusions.

13. A securing assembly according to claim 9, wherein a gap is defined between the second joining formation and the engaging formation, the attaching arrangement being joined to the insertion arrangement by the first joining formation being received in the gap between the second joining formation and the engaging formation.

14. A securing assembly according to claim 5, wherein the first joining formation may comprise a pair of the first projecting members arranged opposite one another across the tool receiving cavity.

15. A securing assembly according to claim 5, wherein the second joining formation comprises a pair of the second projecting members, which extend opposite each other from the guide member.

16. A securing assembly according to claim 1, wherein the guide member is configured to guide the elongate suspending member into the through passage defined by the insertion arrangement, whereby the elongate suspending member is arranged through the guide member so that the elongate suspending member extends through the passage in the insertion arrangement.

17. A method of using a securing assembly as claimed in claim 1, said method comprising inserting the insertion arrangement into an article, and connecting the connector to the elongate suspending member.

18. An attaching arrangement for attaching an insertion arrangement to an elongate suspending member, the attaching arrangement comprising a cooperating joining formation for joining the attaching arrangement to the insertion arrangement, wherein the attaching arrangement defines a through passage to allow a suspending member to be inserted therethrough, wherein the attaching arrangement further includes a fastening formation for fastening the attaching arrangement to a connector; and the attaching arrangement comprises a guide member on which the joining formation is provided, the guide member projecting beyond the joining formation to be received in a tool receiving cavity defined by the insertion arrangement, and wherein the passage in the attaching arrangement extends through the guide member.

19. A securing assembly for use in suspending an article, the securing assembly comprising:

an insertion arrangement for insertion into the article, the insertion arrangement comprising an insertion portion to be inserted into the article, wherein the insertion portion has an external thread thereon;

an attaching arrangement for attaching the insertion arrangement to a connector configured to connect the securing assembly to an elongate suspending member;

wherein the attaching arrangement further includes a fastening formation for fastening the attaching arrangement to the connector;

wherein the insertion arrangement and the attaching arrangement comprise cooperating joining formations to join the attaching arrangement to the insertion arrangement;

wherein each of the insertion portion and the attaching arrangement define a respective through passage to allow the suspending member to be inserted through the securing assembly; and wherein the fastening formation comprises a threaded lug, whereby the threaded lug can be screwed into a threaded bore in the connector to fasten the fastening formation to the connector.

20. A securing assembly for use in suspending an article, the securing assembly comprising:

an insertion arrangement for insertion into the article, the insertion arrangement comprising an insertion portion to be inserted into the article, wherein the insertion portion has an external thread thereon;

an attaching arrangement for attaching the insertion arrangement to a connector configured to connect the securing assembly to an elongate suspending member;

wherein the attaching arrangement further includes a fastening formation for fastening the attaching arrangement to the connector;

wherein the insertion arrangement and the attaching arrangement comprise cooperating joining formations to join the attaching arrangement to the insertion arrangement;

wherein each of the insertion portion and the attaching arrangement define a respective through passage to allow the suspending member to be inserted through the securing assembly; and wherein the insertion arrangement comprises a first joining formation comprising two first projecting members, and the attaching arrangement comprises a second joining formation comprising two second projecting members, wherein the first projecting members engage the second projecting members to join the attaching arrangement to the insertion arrangement.

* * * * *